United States Patent [19]
Decis

[11] 3,811,395
[45] May 21, 1974

[54] AUTOMATIC PILOT DEVICE

[76] Inventor: Mario Decis, 800 Rue de la Roguette, Paris 11eme, France

[22] Filed: Feb. 27, 1973

[21] Appl. No.: 336,257

[52] U.S. Cl. .............................................. 114/144 R
[51] Int. Cl. ...................... B63h 25/04, B63h 25/06
[58] Field of Search ................. 114/144 R; 318/489

[56] References Cited
UNITED STATES PATENTS

| | | | |
|---|---|---|---|
| 2,951,460 | 9/1960 | Pierson | 114/144 R |
| 3,685,478 | 8/1972 | Casani et al. | 114/144 R |
| 3,237,583 | 3/1966 | Johnson | 114/144 R |
| 3,699,420 | 10/1972 | Kundler et al. | 114/144 R |

Primary Examiner—Trygve M. Blix

[57] ABSTRACT

An automatic pilot device of uncomplicated construction is disclosed. The device includes an electric motor, mounted on a tiller or other component mechanically connected to a rudder, and a line having a limited degree of flexibility for coupling a pulley on the motor output shaft to at least a first fixed point on the apparatus to be steered. The automatic steering device also includes electronics for controlling the direction of rotation of the motor whereby the line may be wound on the pulley so as to cause the tiller to be pulled in the direction commensurate with correcting a steering error.

5 Claims, 3 Drawing Figures

AUTOMATIC PILOT DEVICE

BACKGROUND OF THE INVENTION

1. Field of the Invention

The present invention relates to automatic course maintenance and particularly to the automatic steering of small vehicles equipped with rudders and associated tillers. More specifically, this invention is directed to apparatus for use in the automatic steering of small boats and other similar apparatus. Accordingly, the general objects of the present invention are to provide novel and improved methods and apparatus of such character.

2. Description of the Prior Art

Equipment for automatically steering a vehicle, i.e., automatic pilot devices; are well known and are commonly employed on aircraft and large marine vessels. The prior art automatic steering equipment is characterized by large size, complexity, high cost and comparatively large power requirements. These characteristics of presently available automatic steering devices have prevented their use in environments where the user must of necessity consider and limit size, initial cost or energy consumption demands. An example of an environment where automatic steering has not found favor is on small boats of the type wherein steering is accomplished by means of a tiller or helm which acts directly on the rudder. At the present time such craft are steered by a crew member who must pay continuous attention to the navigation of the craft; i.e., the tiller must be continuously controlled if a given course is to be maintained.

SUMMARY OF THE INVENTION

The present invention overcomes the above briefly discussed and other disadvantages of the prior art by providing a small, inexpensive and uncomplicated automatic steering device characterized by ease of installation and operation and by low energy consumption requirements. As a consequence of these characteristics, the automatic steering device of the present invention is particularly well suited for use on small tiller-steered craft. In operation, the present invention will permit the helm to be held in a medium or neutral position once a desired course is achieved and thereafter the apparatus will move the helm automatically to either side of this medium position to correct for deviations from the desired course and will thereafter bring the helm back to the medium position after the course deviation has been nulled.

In accordance with the present invention an electric motor is mounted directly on the helm. The direction of rotation of the motor output shaft, which has a pulley affixed thereto, is controlled by an electronic control circuit. A line is wound around the pulley on the motor output shaft and connected to at least a first fixed point on the apparatus to be steered whereby rotation of the pulley will result in movement of the helm. In a preferred embodiment the line passing around the pulley is affixed to two oppositely disposed fixed points on the apparatus being steered and elastic means are provided in the line at either side of the helm.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
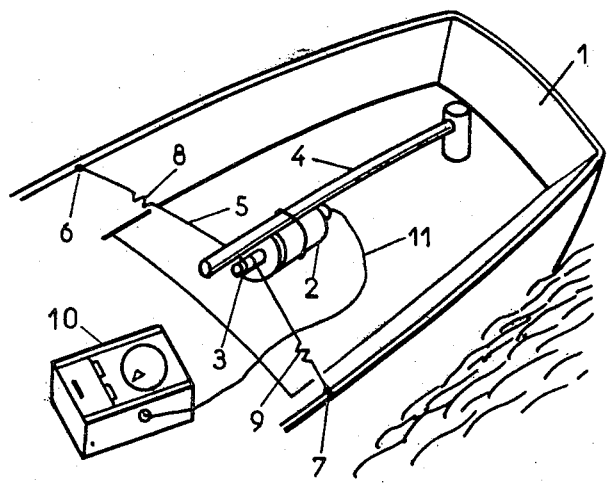
FIG. 1 is a schematic perspective view of a portion of a small boat, FIG. 1 depicting the installation of the automatic steering device of the present invention on the boat.

Referring first to FIG. 1, a portion of a small boat, for example a sailboat, is indicated at 1. In accordance with the present invention a motor housing 2 is mounted on the tiller bar 4 of boat 1; tiller bar 4 being directly connected to the rudder in the manner well known in the art. The motor housing 2 has installed therein a bi-directional electric motor 16 (FIGS. 2 and 3) and control circuitry therefor. A pulley 3 is mounted on a drive shaft coupled to the motor. The pulley 3 is in turn coupled, via a line or wheel rope 5, to a pair of oppositely disposed fixed points 6 and 7 on boat 1. The wheel rope 5 is, of course, passed around pulley 3 a sufficient number of times to prevent slippage.

In making the installation depicted in FIG. 1 care will be taken to insure that the axis of rotation of pulley 3 is parallel with the axis of the helm or tiller bar 4. With the motor in its normal position and the boat 1 headed in the desired direction, the tiller bar 4 and thus the rudder will be held in the position shown by means of the wheel rope 5. Although not mandatory, it is usually considered desirable to insure that the wheel rope 5 has a degree of elasticity thereby isolating the motor output shaft from damage due to shocks due to waves. The elasticity may be imparted to wheel rope 5 by means of elastic inserts 8, known in the art as "Sandows." Alternatively, means such as springs may be employed to couple the opposite ends of wheel rope 5 to the anchors 6 and 7 in the side plankings of boat 1. Either means for imparting some elasticity to rope 5 insures that the wheel rope will exert a predetermined force on the pulley thereby holding the tiller bar in the desired position.

Means for generating control signals for the motor and other components located in housing 2 is indicated at 10. The control signal generator 10 is coupled to housing 2 by means of a multiconductor flexible electrical cable 11. Control signal generator 10 detects deviations in the course of boat 1 from the desired direction and provides output signals which are indicative of the direction of course deviation. Control signal generator 10 may take several forms and one embodiment will be discussed in the description of FIG. 3 below. Thus, by way of example, control signal generator 10 may be an opto-electric device and associated magnetic compass mechanism or any other device based on sensing the magnetic field of the earth. Alternatively, control signal generator 10 may include some other directional reference establishing means such as a wind vane or radio-compass or the control signal generator may be merely a manually operated remote control device. The control signal generator 10 is preferably positioned on the map table of boat 1 so as to permit easier orientation with the navigational position of the boat.

Figure 3:
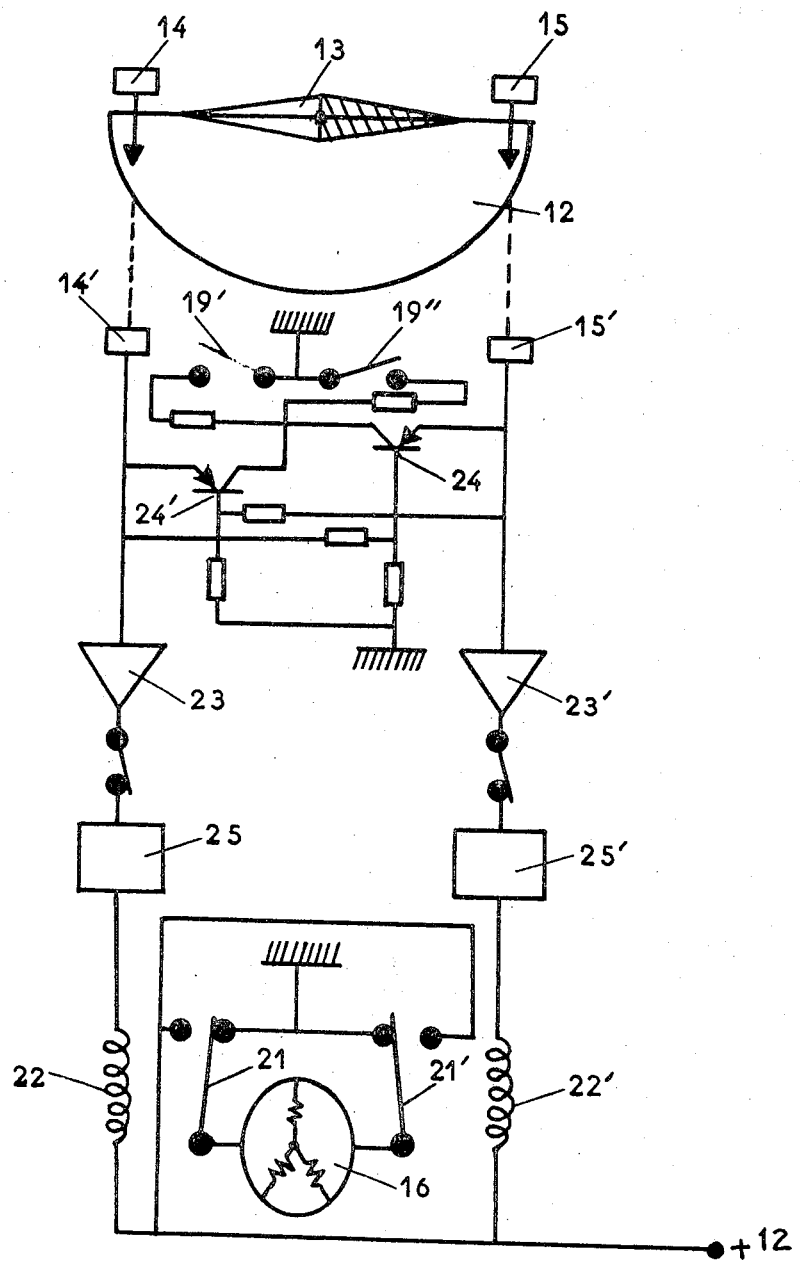
FIG. 3 is an electrical schematic diagram of a preferred embodiment of the present invention.

Referring to FIG. 3, the devices which comprise one embodiment of control signal generator 10 include a pair of light emitters 14 and 15 and associated detectors 14' and 15'. An opaque screen 12 is disposed intermediate the light emitters 14 and 15 and their associated detectors 14' and 15'. Screen 12 is adjustably supported on magnet 13 and thus is rotatable therewith in the same manner as a compass needle. The optical axis between emitters 14 and 15 and their detectors 14' and 15' are parallel with the axis of rotation of screen 12. The manner of initial adjustment of the control signal generator is in accordance with well known techniques. Thus, it should suffice to point out that, after the desired course is selected and the control adjusted, deviations in the heading of the craft of more than a preselected amount, for example ± 3°, will result in one of the detectors 14' or 15' receiving light emitted by its associated emitter whereby an electrical error signal commensurate with the direction of the course deviation is generated by the thus exposed detector.

Figure 2:
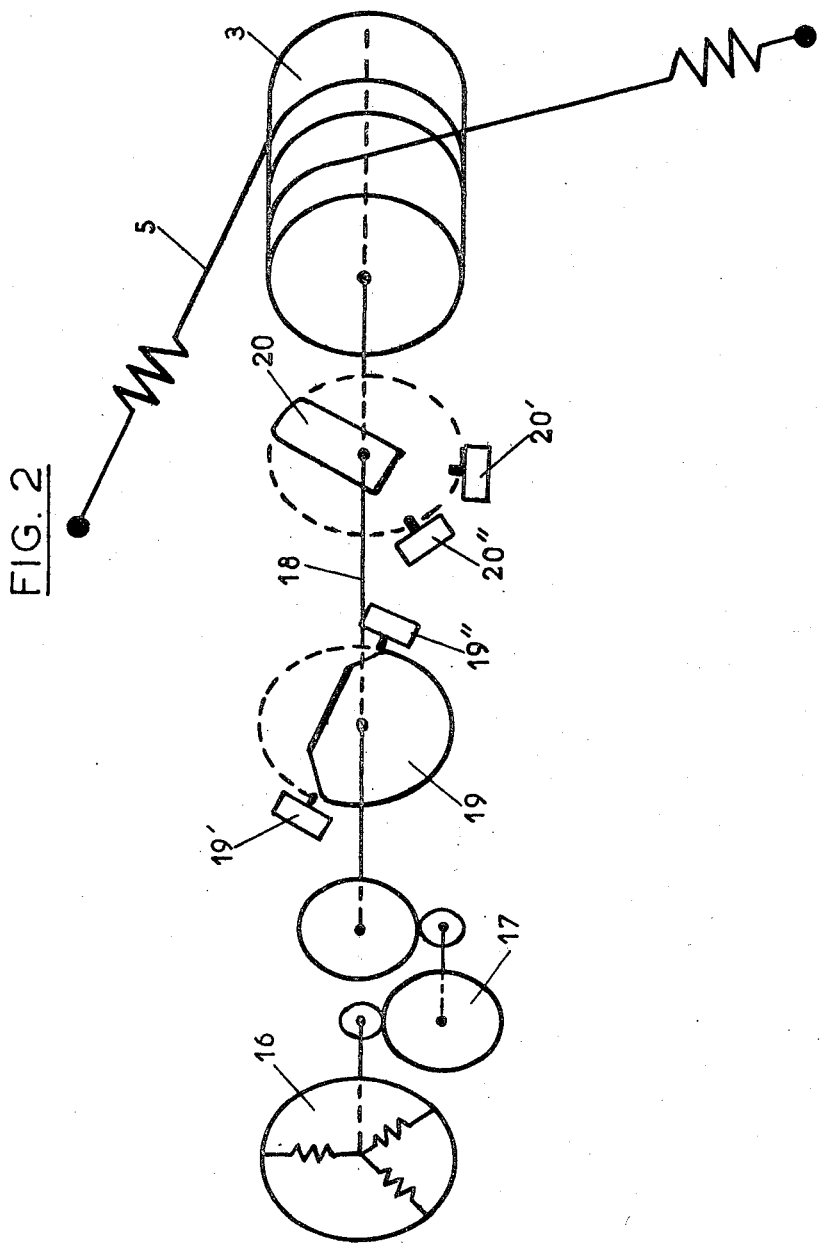
FIG. 2 is a schematic view of the portion of the steering control of the present invention which will be mounted on the tiller of the boat in the FIG. 1 embodiment.

Referring to FIG. 2, the motor housing contains the motor 16 and, connected to the output shaft thereof, speed reduction gearing indicated at 17. The output shaft 18 of speed reducer 17 has, mounted thereon, a pair of cams 19 and 20 and the pulley 3. The cam 19 controls the operation of a pair of normally open micro-switches 19' and 19". The cam 20 controls the operation of a pair of normally closed micro-switches 20' and 20".

Referring again to FIG. 3, during operation of the invention the light emitters 14 and 15 are energized. With the boat 1 headed in the desired direction neither of detectors 14' and 15' will receive light and thus neither detector will produce an output signal. However, if the boat changes its heading the screen 12 will rotate thereby causing, depending on the direction of such rotation, one of the detectors 14', 15' to receive the emitted light whereby the thus energized detector will produce a control signal. This control signal will be applied as a blocking bias to the base of a normally nonconductive transistor in a switch means which includes the contacts of switches 19' and 19". The operation of this switch means will be described below. The control signal generated by the energization of one of the photodetectors 14', 15' will also be applied to its associated amplifier means 23 or 23'.

Presuming that screen 12 has rotated in the appropriate direction so as to cause the energization of photo-detector 14', a blocking bias will be applied to the base of transistor 24 in the switch means. Amplifier 23 will simultaneously be energized by the signal provided by detector 14' and will conduct. With amplifier 23 conductive, current will flow via the normally closed contacts of switch 20' through the solenoid 22 of a motor control relay thereby causing closing of the normally open contacts 21 of the motor control relay. Accordingly, the motor 16 will be energized and will rotate in a first direction. The rotation of the motor in a first direction will drive cam 19 to the position where micro-switch 19' will be closed. At this time, without the blocking bias applied to the base of transistor 24, transistor 24 would become conductive and would apply a control signal for the closing of contacts 21' via amplifier 23' and solenoid 22'. However, since transistor 24 is blocked by the signal generated by the conduction of photodetector 14', the other motor control relay including solenoid 22' remains unenergized. The motor 16 will continue to rotate until cam 20 causes the opening of the normally closed contacts of switch 20'. The pulley 3 will, accordingly, move along wheel rope 5 in a first direction until switch 20' is opened and will stop at this point until the course error has been nulled as indicated by the screen 12 again blocking the light transmission between emitter 14 and detector 14'.

At the instant the course error is nulled the switch 19' will be closed, switch 19" open, switch 20' open and switch 20" closed. Upon the deenergization of photo-detector 14', the blocking bias will be removed from the base of transistor 24 and the transistor will conduct; the current flow being via the closed contacts of switch 19'. The conduction of transistor 24 will cause the energization of amplifier 23' and the resulting current flow through solenoid 22' will cause the closing of relay contacts 21' of the second motor control relay whereby motor 16 will operate in the opposite direction until cam 19 again causes the return of switch 19' to its normally open condition. As can be seen from the configuration of cam 19, when the switch 19' is reopened the tiller bar will have returned approximately to its starting or neutral position.

As will now be obvious to those skilled in the art, any directional deviation of the boat which exceeds a preselected number of degrees, as selected by the user, will result in the rotation of pulley 3 and consequently the movement of the tiller bar in the direction of the required correction. As soon as the course deviation becomes sufficiently small the pulley will be returned to its neutral position and consequently the helm will be returned to the medium balance position. The foregoing operation is achieved without the necessity of a complicated mechanical or electro-mechanical transmission mechanism between the helm and the servo motor 16. The motor, the cams and all of the electronic components with the exception of the photodetectors 14' and 15' are preferably mounted within the motor housing 2. Other positional arrangements are, of course, possible.

If deemed necessary or desirable, delay devices indicated respectively at 25 and 25' may be incorporated in the circuit to impart a delay to the operation of the apparatus thereby facilitating adjustment of the apparatus to newly commanded courses.

The degree of elasticity in the wheel rope 5 and the permitted minimum course deviation as established by screen 12 are, of course, matters of choice which can be determined by the user. Similarly, the components which comprise the system, and particularly the diameter of pulley 3, will be chosen so as to be commensurate with an operation which is substantially free of hunting. The steering control of the present invention, because of its uncomplicated nature, is inexpensive and highly reliable as well as requiring very limited clearances for installation. Also, since the steering control required only a low power motor and employs solid state circuitry, the apparatus may function properly for long periods of time from a d.c. battery power supply.

While a preferred embodiment has been shown and described, various modifications and substitutions may be made thereto without departing from the spirit and scope of the invention. Accordingly, it is to be understood that the present invention has been shown and described by way of illustration and not limitation.

What is claimed is:

1. An automatic steering control for a boat, the boat having a rudder positionable by means of a tiller bar, said control comprising:
   means responsive to variations in the heading of the boat with respect to a desired heading for providing error signals commensurate with the direction of the heading error;
   a bi-directional electric motor mounted on the tiller bar for movement therewith, said motor having a rotatable output shaft oriented parallelly with the tiller bar;
   amplifier means for applying said heading error signals to said motor to cause energization thereof whereby the direction of rotation of said motor output shaft will be commensurate with the direction of the error as indicated by said error signals;
   a pulley mounted on said motor output shaft for rotation therewith; and
   cable means resiliently connecting said pulley to at least a first fixed point on the boat, said cable means including a line partly wound around said pulley whereby rotational motion of said motor output shaft will be transformed to translational motion of the motor and the tiller bar to which said motor is mounted.

2. The apparatus of claim 1 further comprising:
   means including said cable means for resiliently connecting said pulley to a second fixed point on the boat, said first and second fixed points being oppositely disposed with respect to the normal position of said tiller bar and motor.

3. The control of claim 1 wherein said cable means comprises:
   a cable;
   cable anchor means affixed to the boat at said first fixed point; and
   elastic means coupling said cable to said anchor means.

4. The control of claim 1 wherein said cable means comprises:
   cable anchor means attached to the boat at said first fixed point; and
   a line having a flexible portion, said line extending between said anchor means and said pulley whereby said cable means has a predetermined degree of elasticity.

5. The control of claim 1 wherein said amplifier means comprises:
   a clockwise control relay for applying power to said motor to cause clockwise operation thereof;
   a counterclockwise control relay for applying power to said motor to cause counterclockwise operation thereof;
   means for applying signals commensurate with heading errors in a first direction to said clockwise relay whereby said motor will be energized and said tiller means moved to a first preset correction position;
   means for applying signals commensurate with heading errors in the second direction to said counterclockwise relay whereby said motor will be energized and said tiller means moved to a second preset correction position; and
   switch means for generating control signals for causing said motor output shaft to return to its starting position subsequent to nulling of the heading error, said switch means providing control signals to said applying means after removal of an error signal until the motor output shaft approaches its starting position.

* * * * *